United States Patent
Jiang (10) Patent No.: US 12,294,758 B2
(45) Date of Patent: May 6, 2025

(54) CONTROL SETTING METHOD AND APPARATUS, ELECTRONIC DEVICE AND INTERACTION SYSTEM

(71) Applicant: BEIJING BYTEDANCE NETWORK TECHNOLOGY CO., LTD., Beijing (CN)

(72) Inventor: Zerui Jiang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 92 days.

(21) Appl. No.: 17/774,824

(22) PCT Filed: Nov. 3, 2020

(86) PCT No.: PCT/CN2020/126120
§ 371 (c)(1),
(2) Date: May 5, 2022

(87) PCT Pub. No.: WO2021/088794
PCT Pub. Date: May 14, 2021

(65) Prior Publication Data
US 2022/0408143 A1 Dec. 22, 2022

(30) Foreign Application Priority Data
Nov. 5, 2019 (CN) .......................... 201911070711.5

(51) Int. Cl.
*H04N 21/431* (2011.01)
*H04N 21/2187* (2011.01)
(Continued)

(52) U.S. Cl.
CPC ..... *H04N 21/4312* (2013.01); *H04N 21/2187* (2013.01); *H04N 21/437* (2013.01); *H04N 21/4784* (2013.01); *H04N 21/6547* (2013.01)

(58) Field of Classification Search
CPC .......... H04N 21/4312; H04N 21/2187; H04N 21/437; H04N 21/4784; H04N 21/6547; G06F 9/451; G06F 9/4451; G06F 16/9577
See application file for complete search history.

(56) References Cited

U.S. PATENT DOCUMENTS 10,455,291 B2   10/2019 Bernstein et al.
2016/0050445 A1  2/2016 Baghdassarian et al.
(Continued)

FOREIGN PATENT DOCUMENTS

CN   106604046 A   4/2017
CN   106954078 A   7/2017
(Continued)

OTHER PUBLICATIONS

International Patent Application No. PCT/CN2020/126120; Int'l Written Opinion and Search Report; dated Feb. 7, 2021; 10 pages.

*Primary Examiner* — Alazar Tilahun
(74) *Attorney, Agent, or Firm* — BakerHostetler (57) ABSTRACT

A control setting method and apparatus, an electronic device, and an interaction system, which belong to a technical field of computer applications; and the method includes: determining, according to an input operation of a user, a target object to be displayed; sending a display request to a server, where the display request includes an identification information of the target object requested to be displayed; acquiring a setting parameter, returned by the server based on the display request, of an interface control of the target object and displaying the interface control of the target object according to the setting parameter of the interface control. By using the solution of the present disclosure, the client directly sets an interface control according to the setting parameter returned by the server, (Continued)

---

Determining, by a client according to an input operation of a user, a target object to be displayed, and sending a display request to a server; — S101

Searching, by the server according to the identifier information of the target object, a setting parameter of an interface control of the target object, and sending the setting parameter of the interface control of the target object to the client — S102

Displaying, by the client according to the setting parameter of the interface control, the interface control of the target object — S103 which improves timeliness and convenience of displaying the interface control and optimizes interactive experience.

14 Claims, 3 Drawing Sheets

(51) Int. Cl.
    *H04N 21/437*     (2011.01)
    *H04N 21/4784*     (2011.01)
    *H04N 21/6547*     (2011.01)

(56) References Cited

U.S. PATENT DOCUMENTS

| | | | |
|---|---|---|---|
| 2016/0277802 A1* | 9/2016 | Bernstein | H04N 21/44213 |
| 2017/0185422 A1* | 6/2017 | Li | G06F 3/0484 |
| 2018/0124477 A1* | 5/2018 | Qu | H04N 21/8547 |

FOREIGN PATENT DOCUMENTS

| | | | |
|---|---|---|---|
| CN | 108924662 A | 11/2018 | |
| CN | 109725799 A | 5/2019 | |
| CN | 109982102 A | 7/2019 | |
| CN | 110418149 A | 11/2019 | |
| CN | 110908752 A | 3/2020 | |
| CN | 112114928 A | 12/2020 | |

\* cited by examiner

CONTROL SETTING METHOD AND APPARATUS, ELECTRONIC DEVICE AND INTERACTION SYSTEM

This application is the national phase application of PCT International Patent Application No. PCT/CN2020/126120, filed on Nov. 3, 2020, which claims priority of the Chinese patent application entitled "Control Setting Method, Apparatus, Electronic Device and Interaction System" filed to the Patent Office of China on Nov. 5, 2019, with the Application No. CN201911070711.5, the disclosure of which is incorporated herein by reference in their entireties.

TECHNICAL FIELD

The present disclosure relates to a technical field of computer applications, and more particularly, to a control setting method and apparatus, an electronic device and an interaction system.

BACKGROUND

With development of computer technology, terminal interaction and display functions are more and more optimized. When a client displays an interface, a control of the display interface is usually set according to a local control setting parameter. When the client interacts with another terminal device, a control display solution cannot be adaptively adjusted according to display requirements of a peer device.

It can be seen that the existing control display solution has technical problems of monotonous setting mode and poor adaptability.

SUMMARY

In view of this, embodiments of the present disclosure provide a control setting method and apparatus, an electronic device and an interaction system, which at least partially solve the problem existing in the prior art.

In a first aspect, the embodiments of the present disclosure provide a control setting method, applied to a client, the method including:
  determining, according to an input operation of a user, a target object to be displayed;
  sending a display request to a server, the display request includes an identification information of the target object requested to be displayed;
  acquiring a setting parameter, returned by the server based on the display request, of an interface control of the target object; and
  displaying the interface control of the target object according to the setting parameter of the interface control.

According to a specific implementation of the embodiments of the present disclosure, the target object is a live broadcast room;
  the interface control of the target object includes at least one of a comment control, a bullet screen control, and a gift-giving control of the live broadcast room.

According to a specific implementation of the embodiments of the present disclosure, a step of displaying the interface control of the target object according to the setting parameter of the interface control, includes:
  determining a first type of interface control that is allowed to be displayed; and
  displaying the first type of interface control on an interface of the live broadcast room.

According to a specific implementation of the embodiments of the present disclosure, a step of displaying the interface control of the target object according to the setting parameter of the interface control, includes:
  determining a second type of interface control that is forbidden to be displayed; and
  displaying, on an interface of the live broadcast room, other interface controls except the second type of interface control among all the interface controls.

In a second aspect, the embodiments of the present disclosure provide another control setting method, applied to a server, the method including:
  receiving a display request sent by a client, the display request includes an identification information of a target object requested by the client to be displayed;
  searching, according to the identification information of the target object, a setting parameter of an interface control of the target object; and
  sending the setting parameter of the interface control of the target object to the client, so that the client displays the interface control of the target object according to the setting parameter of the interface control.

According to a specific implementation of the embodiments of the present disclosure, the target object is a live broadcast room;
  the interface control of the target object includes at least one of a comment control, a bullet screen control, and a gift-giving control of the live broadcast room.

According to a specific implementation of the embodiments of the present disclosure, a step of searching, according to the identification information of the target object, a setting parameter of an interface control of the target object, includes:
  determining, according to the identification information of the target object, an identification information of a first type of interface control that the target object allows to display;
  a step of sending the setting parameter of the interface control of the target object to the client, so that the client displays the interface control of the target object according to the setting parameter of the interface control, includes:
  sending the identification information of the first type of interface control to the client, so that the client displays the first type of interface control on an interface of the live broadcast room.

According to a specific implementation of the embodiments of the present disclosure, a step of searching, according to the identification information of the target object, a setting parameter of an interface control of the target object, includes:
  determining, according to the identification information of the target object, an identification information of a second type of interface control that the target object forbids to display;
  a step of sending the setting parameter of the interface control of the target object to the client, so that the client displays the interface control of the target object according to the setting parameter of the interface control, includes:
  sending the identification information of the second type of interface control to the client, so that the client displays other interface controls except the second type of interface control among all the interface controls on an interface of the live broadcast room.

In a third aspect, the embodiments of the present disclosure further provide another control setting method, applied to an interaction system including a server and a client; the method including:

determining, by the client according to an input operation of a user, a target object to be displayed, and sending a display request to the server, the display request includes an identification information of the target object requested to be displayed;

searching, by the server according to the identification information of the target object, a setting parameter of an interface control of the target object, and sending the setting parameter of the interface control of the target object to the client; and displaying, by the client according to the setting parameter of the interface control, the interface control of the target object.

In a fourth aspect, the embodiments of the present disclosure provide a control setting apparatus, including:

a determining module, configured to determine, according to an input operation of a user, a target object to be displayed;

a sending module, configured to send a display request to a server, the display request includes an identification information of the target object requested to be displayed;

an acquiring module, configured to acquire a setting parameter of an interface control of the target object returned by the server based on the display request; and a display module, configured to display the interface control of the target object according to the setting parameter of the interface control.

In a fifth aspect, the embodiments of the present disclosure provide an interaction system, including a server and a client, the client is configured to determine, according to an input operation of a user, a target object to be displayed, and send a display request to a server, the display request includes an identification information of the target object requested to be displayed;

the server is configured to search, according to the identification information of the target object, a setting parameter of an interface control of the target object, and send the setting parameter of the interface control of the target object to the client; and the client is further configured to display the interface control of the target object according to the setting parameter of the interface control.

In a sixth aspect, the embodiments of the present disclosure further provide an electronic device, including:

at least one processor; and a memory, communicatively connected to the at least one processor;

the memory stores instructions executable by the at least one processor; and the instructions are executed by the at least one processor, so that the at least one processor executes the control setting method according to the aforementioned first to third aspects and any implementation manner thereof.

In a seventh aspect, the embodiments of the present disclosure further provide a non-transitory computer-readable storage medium, the non-transitory computer-readable storage medium stores computer instructions; and the computer instructions are configured to cause a computer to execute the control setting method according to the aforementioned first to third aspects and any implementation manner thereof.

In an eighth aspect, the embodiments of the present disclosure further provide a computer program product, including a computer program stored on a non-transitory computer-readable storage medium; the computer program includes program instructions; and when the program instructions are executed by a computer, the computer is caused to execute the control setting method according to the aforementioned first to third aspects and any implementation manner thereof.

The control setting solution in the embodiments of the present disclosure includes: determining, according to an input operation of a user, a target object to be displayed; sending a display request to a server, the display request includes an identification information of the target object requested to be displayed; acquiring a setting parameter, returned by the server based on the display request, of an interface control of the target object; and displaying the interface control of the target object according to the setting parameter of the interface control. With the solution of the present disclosure, the client directly sets an interface control according to a setting parameter returned by a server, which improves timeliness and convenience of interface control display and optimizes interactive experience.

BRIEF DESCRIPTION OF THE DRAWINGS

In order to explain the technical solutions of the embodiments of the present disclosure more clearly, the following briefly introduces the accompanying drawings that need to be used in the embodiments. Obviously, the accompanying drawings in the following description are only some embodiments of the present disclosure. For those of ordinary skill in the art, other drawings can also be obtained from these drawings without any creative effort.

DETAILED DESCRIPTION

The embodiments of the present disclosure will be described in detail below with reference to the accompanying drawings.

The embodiments of the present disclosure are described below through specific examples, and those skilled in the art can easily understand other advantages and effects of the present disclosure from the contents disclosed in this specification. Obviously, the described embodiments are only some, but not all, embodiments of the present disclosure. The present disclosure can also be implemented or applied through other different specific embodiments, and various details in this specification may also be modified or changed based on different viewpoints and applications without departing from the spirit of the present disclosure. It should be noted that the following embodiments and features in the embodiments may be combined with each other under the condition of no conflict. Based on the embodiments in the present disclosure, all other embodiments obtained by those of ordinary skill in the art without creative efforts shall fall within the protection scope of the present disclosure.

It is noted that various aspects of embodiments within the scope of the appended claims are described below. It should be apparent that the aspects described herein may be embodied in a wide variety of forms and that any specific structure and/or function described herein is illustrative only. Based on this disclosure, those skilled in the art should appreciate that an aspect described herein may be implemented independently of any other aspects and that two or more of these aspects may be combined in various ways. For example, an apparatus may be implemented and/or a method may be practiced using any number of the aspects set forth herein. Additionally, the apparatus may be implemented and/or the method may be practiced using other structure and/or functionality in addition to one or more of the aspects set forth herein.

It should also be noted that the drawings provided in the following embodiments are only illustrative of the basic concept of the present disclosure, and only the components related to the present disclosure are shown in the drawings and not drawn according to the number, shape and size of the components in actual implementation. In actual implementation, the type, quantity and proportion of each component may be arbitrarily changed, and the component layout may also be more complicated.

Additionally, in the following description, specific details are provided to facilitate a thorough understanding of the examples. However, one skilled in the art will understand that the described aspects may be practiced without these specific details.

An embodiment of the present disclosure provides a control setting method. The control setting method provided by this embodiment may be executed by a computing apparatus; the computing apparatus may be implemented as software, or implemented as a combination of software and hardware; and the computing apparatus may be integrated in a server, a terminal device, or the like.

Figure 1:
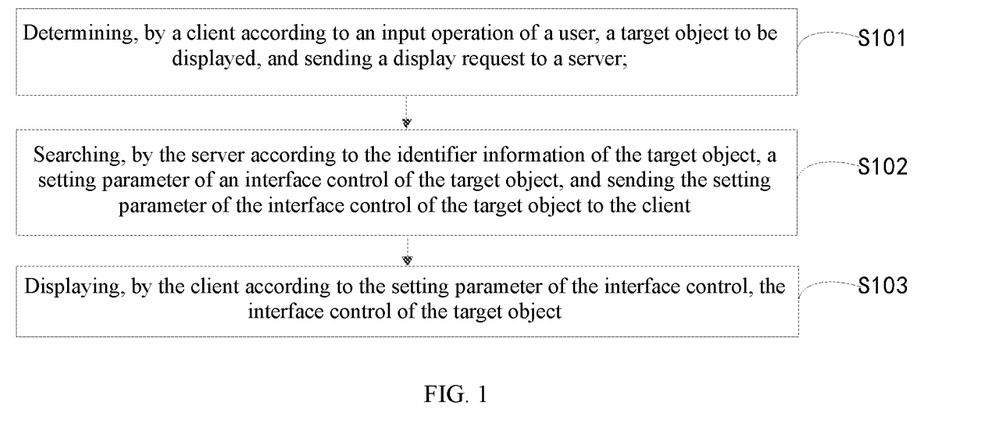
FIG. 1 is a schematic flow chart of a control setting method applied to an interaction system provided by an embodiment of the present disclosure.
Figure 2:
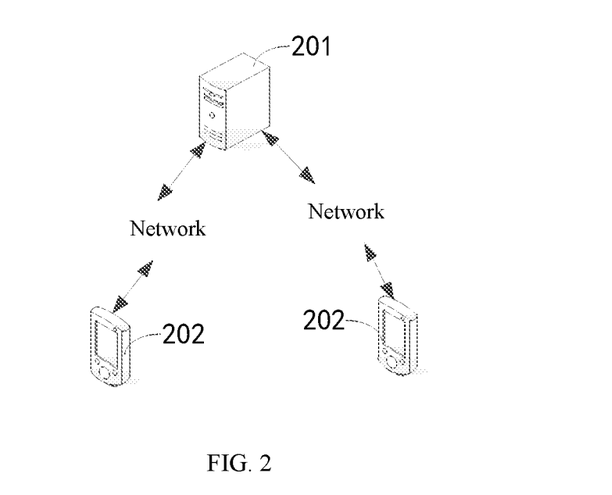
FIG. 2 is a schematic diagram of an interaction system to which the control setting method provided by the embodiment of the present disclosure is applied.

Referring to FIG. 1, an embodiment of the present disclosure provides a control setting method; and the control setting method provided by this embodiment is applied to an interaction system. As shown in FIG. 2, the interaction system includes a server 201 and a client 202, there may be a plurality of clients 202, and the plurality of clients 202 may all interact with the server 201. As shown in FIG. 1, the method mainly includes:

S101: determining, by a client according to an input operation of a user, a target object to be displayed, and sending a display request to a server; the display request includes an identification information of the target object requested to be displayed.

The control setting method provided by the embodiment of the present disclosure is applied to a control setting scenario in a display interface of the client, and implements a remote control solution of control setting performed by the server on the client through interaction between the server and the client. The client involved in this embodiment may be a client with functions such as video playback and other interface display and control setting functions in the interface; and the applied scenario may be a control setting scenario of the display interface when the client enters a live broadcast room to watch a live broadcast content.

When the user of the client needs to watch the live broadcast room, etc., the user may perform a relevant operation on the client to indicate the object requested to be displayed; the object here may be a live broadcast room, a host, a digital channel, etc. The object currently requested by the user to be displayed is defined as a target object; and for convenience of description, the target object referred to in this embodiment is a live broadcast room or a host.

When the user performs an input operation on the client, the user will manually input or selectively input an identification information of the target object requested to be displayed, for example, a live broadcast room ID or a host ID; and the client determines the target object to be displayed according to the identification information.

After receiving the input operation and determining the target object to be displayed, the client generates a display request, and sends the generated display request to the server, to request to display a relevant content of the target object.

S102: searching, by the server according to the identification information of the target object, a setting parameter of an interface control of the target object, and sending the setting parameter of the interface control of the target object to the client.

Control setting parameters corresponding to respective objects are pre-stored in the server, each group of control setting parameters is used to indicate authority of a relevant control when the object is displayed on the client; and the setting parameter of the interface control of each object is stored corresponding to the identification information of the object. The interface control involved here may include at least one of a comment control, a bullet screen control, and a gift-giving control of the live broadcast room, and the setting parameter of each control is used to indicate to display the control and a relevant parameter during display, or to indicate not to display the control.

After receiving the display request sent by the client, the server finds the setting parameter of the interface control corresponding to the target object according to the identification information of the requested target object, and sends a found interface control parameter of the target object to the client.

S103: displaying, by the client according to the setting parameter of the interface control, the interface control of the target object.

In this way, after receiving the setting parameter of the interface control of the target object, the client may set the interface control of the target object according to the setting parameter of the interface control, and control display of respective controls on the interface of the target object.

For example, if the target object is a certain live broadcast room, and the live broadcast room forbids a comment function and allows a gift-giving function, then after the client sets according to the setting parameter of the interface control, the display interface of the live broadcast room displayed is set with a gift-giving related control, and is not set with a comment related control.

An interaction process will be further explained below through two specific implementation modes.

Figure 3:
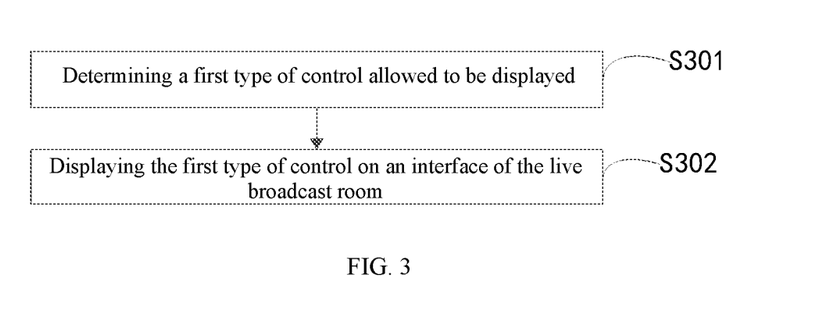
FIG. 3 is a schematic partial flow chart of another control setting method provided by an embodiment of the present disclosure.

As shown in FIG. 3, in a specific implementation mode of the embodiment of the present disclosure, the setting, by the client according to the setting parameter of the interface control, the interface control of the target object as described in the above step S103, may include:

S301: determining a first type of control allowed to be displayed;

S302: displaying the first type of control on an interface of the live broadcast room.

In the implementation mode, the setting parameter of the interface control returned by the server is used to indicate the control that the target object allows to display, that is, the functional control with open authority, and such type of control is defined as the first type of control. The client determines the first type of control that the target object allows to display according to the setting parameter of the interface control, and the first type of control that the part allows to display is displayed on the interface of the live broadcast room.

Figure 4:
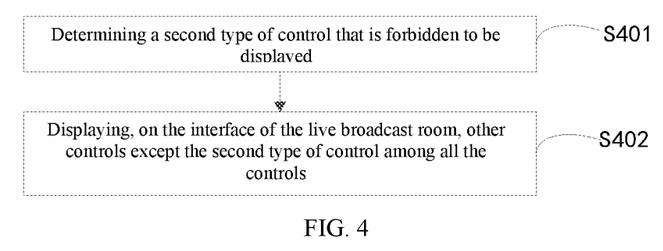
FIG. 4 is a schematic partial flow chart of another control setting method provided by an embodiment of the present disclosure.

As shown in FIG. 4, according to another specific implementation mode of the embodiment of the present disclosure, the displaying, by the client according to the setting parameter of the interface control, the interface control of the target object as described in the above step S103, may include:

S401: determining a second type of control that is forbidden to be displayed;

S402: displaying, on the interface of the live broadcast room, other controls except the second type of control among all controls.

In the implementation mode, the setting parameter of the interface control returned by the server is used to indicate the control that the target object forbids to display, that is, the functional control without open authority, and such type of control is defined as the second type of control. The client determines the second type of control that the target object forbids to display according to the setting parameter of the interface control, and the second type of control that the part allows to display is displayed on the interface of the live broadcast room.

In the control setting method provided by the above-described embodiments of the present disclosure, after the client initiates a display request, the server will return the control authority correspondingly owned by the requested live broadcast room to a packaging service through a pre-determined control setting rule; ports of the respective clients acquire control authority data of the live broadcast room from the packaging service; and the user interface includes a comment window, a comment panel, a bullet screen button, a gift-giving button, a gift-giving panel, a lighting button, etc., the interface controls of the client are changed in real time without going online, thereby saving a lot of online time, and enhancing interactive experience.

Figure 5:
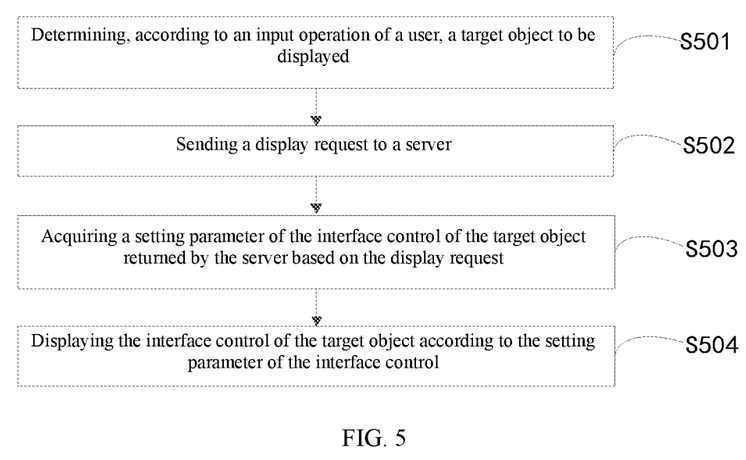
FIG. 5 is a schematic flow chart of another control setting method applied to a client provided by an embodiment of the present disclosure.

Referring to FIG. 5, an embodiment of the present disclosure provides another control setting method. The control setting method provided by the embodiment of the present disclosure differs from the above-described embodiments in that the control setting method provided by this embodiment is applied to a client, and the client is the client according to the above-described embodiment. As shown in FIG. 5, the method mainly includes:

S501: determining, according to an input operation of a user, a target object to be displayed;

S502: sending a display request to a server, the display request includes an identification information of the target object requested to be displayed.

When the user performs an input operation on the client, the user will manually input or selectively input an identification information of the target object requested to be displayed, for example, a live broadcast room ID or a host ID; and the client determines the target object to be displayed according to the identification information. Optionally, the target object is a live broadcast room;

The interface control of the target object includes at least one of a comment control, a bullet screen control, and a gift-giving control of the live broadcast room.

After receiving the input operation and determining the target object to be displayed, the client generates a display request, and sends the generated display request to the server, to request to display a relevant content of the target object.

S503: acquiring a setting parameter of the interface control of the target object returned by the server on the basis of the display request; and S504: displaying the interface control of the target object according to the setting parameter of the interface control.

After receiving the display request sent by the client, the server finds the setting parameter of the interface control corresponding to the target object according to the identification of the requested target object, and sends the found interface control parameter of the target object to the client.

After receiving the setting parameter of the interface control of the target object, the client may set the interface control of the target object according to the setting parameter of the interface control, and control display of the respective controls on the interface of the target object.

According to a specific implementation mode of the embodiment of the present disclosure, the setting the interface control of the target object according to the setting parameter of the interface control as described in the step S504, may include:

Determining a first type of control that is allowed to be displayed;

Displaying the first type of control on an interface of the live broadcast room.

According to another specific implementation mode of the embodiment of the present disclosure, the setting the interface control of the target object according to the setting parameter of the interface control as described in the step S504, may include:

Determining a second type of control that is forbidden to be displayed;

Displaying, on the interface of the live broadcast room, other controls except the second type of control among all controls.

In the control setting method provided by the above-described embodiment of the present disclosure, after the client initiates a display request, the server will return the control authority correspondingly owned by the requested live broadcast room to a packaging service through a pre-determined control setting rule; ports of the respective clients acquire control authority data of the live broadcast room from the packaging service; and the user interface includes a comment window, a comment panel, a bullet screen button, a gift-giving button, a gift-giving panel, a lighting button, etc., the interface controls of the client are changed in real time without going online, thereby saving a lot of online time, and enhancing interactive experience. The specific implementation process of the control setting method provided by the embodiments shown in FIG. 1 to FIG. 4 may be referred to for a specific implementation process of the control setting method provided by the embodiment of the present disclosure, and no details will be repeated here.

Figure 6:
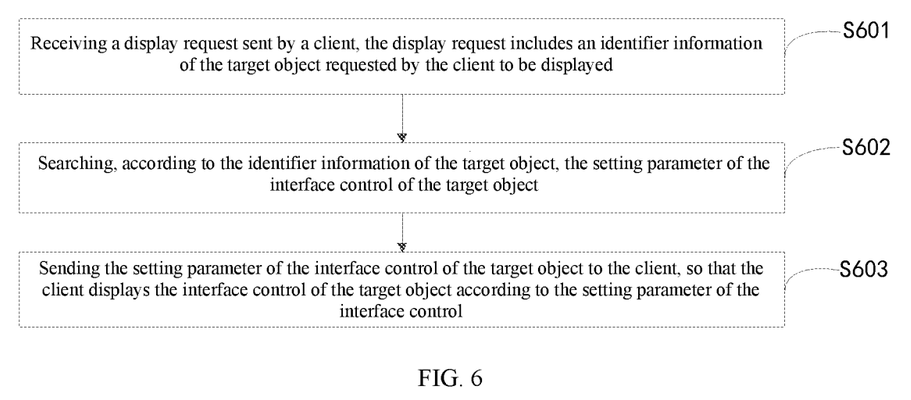
FIG. 6 is a schematic flow chart of another control setting method applied to a server provided by an embodiment of the present disclosure.

Referring to FIG. 6, an embodiment of the present disclosure further provides another control setting method. The control setting method provided by the embodiment of the present disclosure differs from the above-described embodiments in that the control setting method provided by this embodiment is applied to a server. As shown in FIG. 6, the method mainly includes:

S601: receiving a display request sent by a client, the display request includes an identification information of the target object requested by the client to be displayed;

When the user performs an input operation on the client, the user will manually input or selectively input an identification information of the target object requested to be displayed, for example, a live broadcast room ID or a host ID; and the client determines the target object to be displayed according to the identification information. Optionally, the target object is a live broadcast room.

The interface control of the target object includes at least one of a comment control, a bullet screen control, and a gift-giving control of the live broadcast room.

After receiving the input operation and determining the target object to be displayed, the client generates a display request, and sends the generated display request to the server, to request to display a relevant content of the target object.

S602: searching, according to the identification information of the target object, the setting parameter of the interface control of the target object;

S603: sending the setting parameter of the interface control of the target object to the client, so that the client displays the interface control of the target object according to the setting parameter of the interface control.

After receiving the display request sent by the client, the server finds the setting parameter of the interface control corresponding to the target object according to the identification of the requested target object, and sends the found interface control parameter of the target object to the client.

After receiving the setting parameter of the interface control of the target object, the client may set the interface control of the target object according to the setting parameter of the interface control, and control display of the respective controls on the interface of the target object.

According to a specific implementation mode of the embodiment of the present disclosure, the searching, according to the identification information of the target object, the setting parameter of the interface control of the target object as described in step S602, may include:

Determining, according to the identification information of the target object, an identification information of a first type of control that the target object allows to display.

The step of sending the setting parameter of the interface control of the target object to the client, so that the client displays the interface control of the target object according to the setting parameter of the interface control, includes:

Sending the identification information of the first type of control to the client, so that the client displays the first type of control on the interface of the live broadcast room.

According to a specific implementation mode of the embodiment of the present disclosure, the searching, according to the identification information of the target object, the setting parameter of the interface control of the target object as described in step S602, may include:

Determining, according to the identification information of the target object, an identification information of a second type of control that the target object forbids to display.

The step of sending the setting parameter of the interface control of the target object to the client, so that the client displays the interface control of the target object according to the setting parameter of the interface control, includes:

Sending the identification information of the second type of control to the client, so that the client displays other controls except the second type of control among all controls on the interface of the live broadcast room.

In the control setting method provided by the above-described embodiments of the present disclosure, after the client initiates a display request, the server will return the control authority correspondingly owned by the requested live broadcast room to a packaging service through a predetermined control setting rule; ports of the respective clients acquire control authority data of the live broadcast room from the packaging service; and the user interface includes a comment window, a comment panel, a bullet screen button, a gift-giving button, a gift-giving panel, a lighting button, etc., the interface controls of the client are changed in real time without going online, thereby saving a lot of online time, and enhancing interactive experience. The specific implementation process of the control setting method provided by the embodiments shown in FIG. 1 to FIG. 4 may be referred to for a specific implementation process of the control setting method provided by the embodiment of the present disclosure, and no details will be repeated here.

Figure 7:
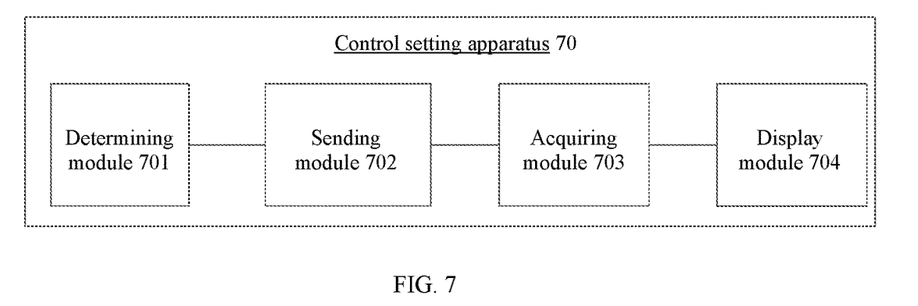
FIG. 7 is a structural schematic diagram of a control setting apparatus provided by an embodiment of the present disclosure.

Corresponding to the above method embodiments, referring to FIG. 7, an embodiment of the present disclosure further provides a control setting apparatus 70, and the control setting apparatus may be a client according to the above-described method embodiments. As shown in FIG. 7, the control setting apparatus 70 mainly includes:

A determining module 701, configured to determine, according to an input operation of a user, a target object to be displayed;

A sending module 702, configured to send a display request to a server, the display request includes an identification information of the target object requested to be displayed;

An acquiring module 703, configured to acquire a setting parameter of an interface control of the target object returned by the server based on the display request;

A display module 704, configured to display the interface control of the target object according to the setting parameter of the interface control.

The apparatus shown in FIG. 7 may correspondingly execute the content in the above-described method embodiments; the content recorded in the above-described method embodiments may be referred to for a part not described in detail in this embodiment, and no details will be repeated here.

Referring to FIG. 2, an embodiment of the present disclosure further provides an interaction system, including a server 201 and a client 202.

The client 201 is configured to determine, according to an input operation of a user, a target object to be displayed, and send a display request to a server, the display request includes an identification information of the target object requested to be displayed;

The server 202 is configured to search, according to the identification information of the target object, a setting parameter of an interface control of the target object, and send the setting parameter of the interface control of the target object to the client;

The client 201 is further configured to display the interface control of the target object according to the setting parameter of the interface control.

The system shown in FIG. 2 may correspondingly execute the content in the above-described method embodiments; the content recorded in the above-described method embodiments may be referred to for a part not described in detail in this embodiment, and no details will be repeated here.

Figure 8:
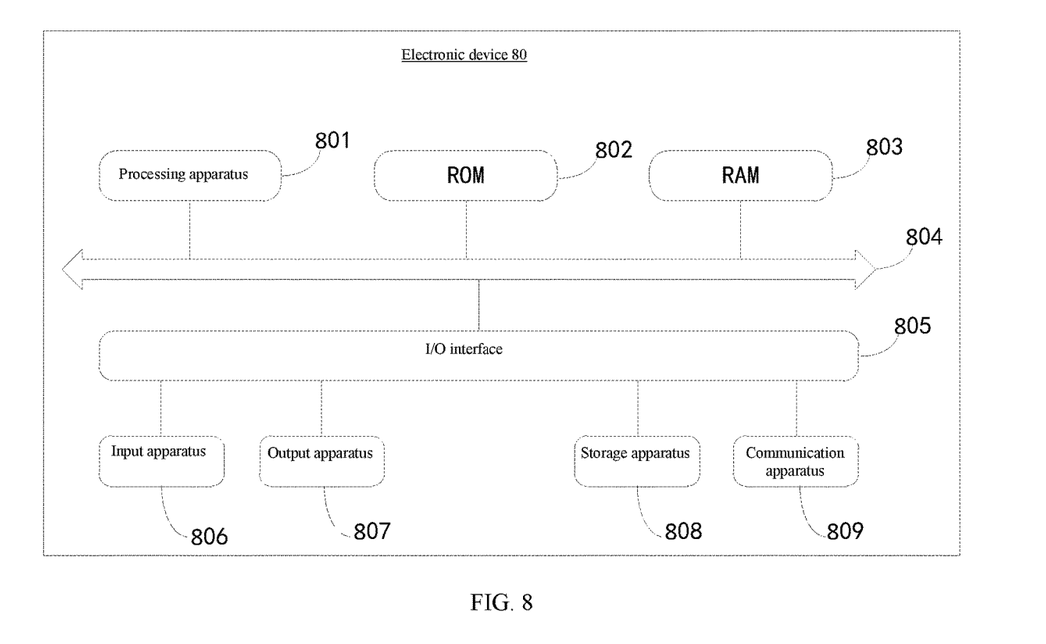
FIG. 8 is a schematic diagram of an electronic device provided by an embodiment of the present disclosure.

In addition, referring to FIG. 8, an embodiment of the present disclosure further provides an electronic device 80; and the electronic device may be the client or the server according to the above-described embodiment. As shown in FIG. 8, the electronic device 80 includes:

At least one processor; and

A memory, communicatively connected to the at least one processor.

The memory stores instructions executable by the at least one processor; and the instructions are executed by the at least one processor, so that the at least one processor executes the control setting method according to the foregoing method embodiments.

An embodiment of the present disclosure further provides a non-transitory computer-readable storage medium; the non-transitory computer-readable storage medium stores computer instructions; and the computer instructions are configured to cause the computer to execute the control setting method according to the foregoing method embodiments.

An embodiment of the present disclosure further provides a computer program product; the computer program product includes a computer program stored on a non-transitory computer-readable storage medium; the computer program includes program instructions; and when executed by a computer, the computer is caused to execute the control setting method according to the foregoing method embodiments.

Hereinafter, referring to FIG. 8, it shows a structural schematic diagram of an electronic device 80 suitable for implementing an embodiment of the present disclosure. The electronic device according to the embodiment of the present disclosure may include, but not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The electronic device shown in FIG. 8 is only an example, and should not impose any limitation on the function and use scope of the embodiments of the present disclosure.

As shown in FIG. 8, the electronic device 80 may include a processing apparatus (e.g., a central processing unit, a graphics processor, etc.) 801, which may executes various appropriate actions and processing according to a program stored in a Read-Only Memory (ROM) 802 or a program loaded from a storage apparatus 808 into a Random Access Memory (RAM) 803. The RAM 803 further stores various programs and data required for operation of the electronic device 80. The processing apparatus 801, the ROM 802, and the RAM 803 are connected with each other through a bus 804. An input/output (I/O) interface 805 is also coupled to the bus 804.

Usually, apparatuses below may be coupled to the I/O interface 805: input apparatuses 806 including, for example, a touch screen, a touch pad, a keyboard, a mouse, an image sensor, a microphone, an accelerometer, a gyroscope, etc.; output apparatuses 807 including, for example, a Liquid Crystal Display (LCD), a speaker, a vibrator, etc.; storage apparatus 808 including, for example, a magnetic tape, a hard disk, etc.; and communication apparatus 809. The communication apparatus 809 may allow the electronic device 80 to perform wireless or wired communication with other device so as to exchange data. Although the diagram shows the electronic device 80 having various apparatuses, it should be understood that it is not required to implement or have all the apparatuses shown, and the electronic device 80 may alternatively implement or have more or fewer apparatuses.

Particularly, according to some embodiments of the present disclosure, the flows as described above with reference to the flow charts may be implemented as computer software programs. For example, the embodiments of the present disclosure include a computer program product, including a computer program carried on a computer-readable medium, the computer program containing program codes for executing the method illustrated in the flow chart. In such embodiments, the computer program may be downloaded and installed from the network via the communication apparatus 809, or installed from the storage apparatus 808, or installed from the ROM 802. When executed by the processing apparatus 801, the computer program executes the above-described functions limited in the methods according to the embodiments of the present disclosure.

It should be noted that, in the present disclosure, the above-described computer-readable medium may be a computer-readable signal medium or a computer-readable storage medium, or any combination of the above two. The computer-readable storage medium may be, for example, but not limited to, electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or Flash memory); an optical fiber, a Portable Compact Disc Read-Only Memory (CD-ROM); an optical storage apparatus; a magnetic storage apparatus; or any suitable combination of the above. In the present disclosure, a computer-readable storage medium may be any tangible medium that contains or stores a program that may be used by or in conjunction with an instruction executing system, an apparatus, or a device. Rather, in the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a Radio Frequency (RF), etc., or any suitable combination of the above.

The above-described computer-readable medium may be included in the above-described electronic device; or may also exist alone without being assembled into the electronic device.

The above-described computer-readable medium carries one or more programs; and when executed by the electronic device, the above one or more programs enable the electronic device to implement the solutions provided by the above-described method embodiments.

Alternatively, the above-described computer-readable medium carries one or more programs; and when executed by the electronic device, the above-described one or more programs enable the electronic device to implement the solutions provided by the above-described method embodiments.

The computer program codes for executing the operations according to the present disclosure may be written in one or more programming languages or a combination thereof; the above-described programming languages include object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In scenarios involving the remote computer, the remote computer may be coupled to the user's computer through any type of network, including a Local Area Network (LAN) or a Wide Area Network (WAN), or may also be coupled to an external computer (e.g., through the Internet using an Internet Service Provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units involved in the embodiments of the present disclosure may be implemented by means of software, or may also be implemented by means of hardware. Names of these units do not constitute a limitation on the units per se in some cases, for example, the first acquiring unit may also be described as "a unit for acquiring at least two internet protocol addresses".

It should be understood that respective parts of the present disclosure may be implemented by hardware, software, firmware, or a combination thereof.

The above are only specific embodiments of the present disclosure, and the protection scope of the present disclosure is not limited to this. Any changes or substitutions that can be easily conceived by any person skilled in the art within the technical scope disclosed in the present disclosure should be included within the protection scope of the present disclosure. Therefore, the protection scope of the present disclosure should be subject to the protection scope of the claims.

What is claimed is:

1. A control setting method, applied to a client, the method comprising:

determining, according to an input operation of a user, identification information of a live streaming room to be displayed;

sending a display request to a server, wherein the display request comprises the identification information of the live streaming room to be displayed, wherein setting parameters associated with the live streaming room to be displayed are pre-stored in the server;

acquiring, returned by the server based on the display request, a plurality groups of setting parameters corresponding to a plurality of interface controls associated with the live streaming room to be displayed, wherein the plurality of interface controls comprise a control configured to implement a comment function and a control configured to implement a gift-giving function, and wherein each of the plurality of groups of setting parameters is configured to indicate whether each of the plurality of interface controls is allowed to display on an interface of the live streaming room to be displayed;

displaying at least one subset of the plurality of interface controls on the interface of the live streaming room based on at least one subset of the plurality groups of setting parameters in response to determining that the at least one subset of the plurality of interface controls is allowed to display on the interface of the live streaming room, wherein the at least one subset of the plurality groups of setting parameters correspond to the at least one subset of the plurality of interface controls.

2. The method according to claim 1, further comprising:
determining a first type of control that is allowed to be displayed; and
displaying the first type of control on the interface of the live streaming room.

3. The method according to claim 1, further comprising:
determining a second type of control that is forbidden to be displayed; and
displaying, on the interface of the live streaming room, other controls except the second type of control among all controls.

4. A control setting method, applied to a server, the method comprising:

receiving a display request sent by a client, wherein the display request comprises identification information of a live streaming room requested by the client to be displayed;

searching, according to the identification information of the live streaming room to be displayed, a plurality groups of setting parameters corresponding to a plurality of interface controls associated with the live streaming room to be displayed, wherein the wherein the plurality of interface controls comprise a control configured to implement a comment function and a control configured to implement a gift-giving function, and wherein each of the plurality of groups of setting parameters is configured to indicate whether each of the plurality of interface controls is allowed to display on an interface of the live streaming room to be displayed; and sending the plurality groups of setting parameters corresponding to the plurality of interface controls to the client, wherein the client displays at least one subset of the plurality of interface controls on the interface of the live streaming room based on at least one subset of the plurality groups of setting parameters in response to determining that the at least one subset of the plurality of interface controls is allowed to display, wherein the at least one subset of the plurality groups of setting parameters correspond to the at least one subset of the plurality of interface controls.

5. The method according to claim 4, further comprising:
determining, according to the identification information of the live streaming room, identification information of a first type of control that the live streaming room allows to display;
sending the identification information of the first type of control to the client, so that the client displays the first type of control on the interface of the live streaming room.

6. The method according to claim 4, further comprising:
determining, according to the identification information of the live streaming room, identification information of a second type of control that the live streaming room forbids to display;
sending the identification information of the second type of control to the client, so that the client displays other controls except the second type of control among all controls on the interface of the live streaming room.

7. An electronic device, comprising:
at least one processor; and
a memory, communicatively connected to the at least one processor;
wherein the memory stores instructions executable by the at least one processor; and
wherein the instructions, when executed by the at least one processor, cause the at least one processor to implement operations comprising:
determining, according to an input operation of a user, identification information of a live streaming room to be displayed;
sending a display request to a server, wherein the display request comprises the identification information of the live streaming room to be displayed, wherein setting parameters associated with the live streaming room to be displayed are pre-stored in the server;
acquiring, returned by the server based on the display request, a plurality groups of setting parameters corresponding to a plurality of interface controls associated with the live streaming room to be displayed, wherein the plurality of interface controls comprise a control configured to implement a comment function and a control configured to implement a gift-giving function, and wherein each of the plurality of groups of setting parameters is configured to indicate whether each of the plurality of interface controls is allowed to display on an interface of the live streaming room to be displayed;
displaying at least one subset of the plurality of interface controls on the interface of the live streaming room based on at least one subset of the plurality groups of setting parameters in response to determining that the at least one subset of the plurality of interface controls is allowed to display on the interface of the live streaming room, wherein the at least one subset of the plurality groups of setting parameters correspond to the at least one subset of the plurality of interface controls.

8. A non-transitory computer-readable storage medium, wherein the non-transitory computer-readable storage medium stores computer instructions; and the computer instructions are configured to cause a computer to execute the control setting method according to claim 1.

9. A computer program product, comprising a computer program stored on a non-transitory computer-readable storage medium; wherein the computer program comprises program instructions; and when the program instructions are executed by a computer, the computer is caused to execute the control setting method according to claim 1.

10. The method according to claim 2, further comprising:
determining a second type of control that is forbidden to be displayed; and
displaying, on the interface of the live streaming room, other controls except the second type of control among all controls.

11. The method according to claim 5, further comprising:
determining, according to the identification information of the live streaming room, identification information of a second type of control that the live streaming room forbids to display;
sending the identification information of the second type of control to the client, so that the client displays other controls except the second type of control among all controls on the interface of the live streaming room.

12. An electronic device, comprising:
at least one processor; and
a memory, communicatively connected to the at least one processor;
wherein the memory stores instructions executable by the at least one processor; and the instructions are executed by the at least one processor, so that the at least one processor executes the control setting method according to claim 4.

13. A non-transitory computer-readable storage medium, wherein the non-transitory computer-readable storage medium stores computer instructions; and the computer instructions are configured to cause a computer to execute the control setting method according to claim 4.

14. A computer program product, comprising a computer program stored on a non-transitory computer-readable storage medium; wherein the computer program comprises program instructions; and when the program instructions are executed by a computer, the computer is caused to execute the control setting method according to claim 4.

* * * * *